Patented Nov. 29, 1932

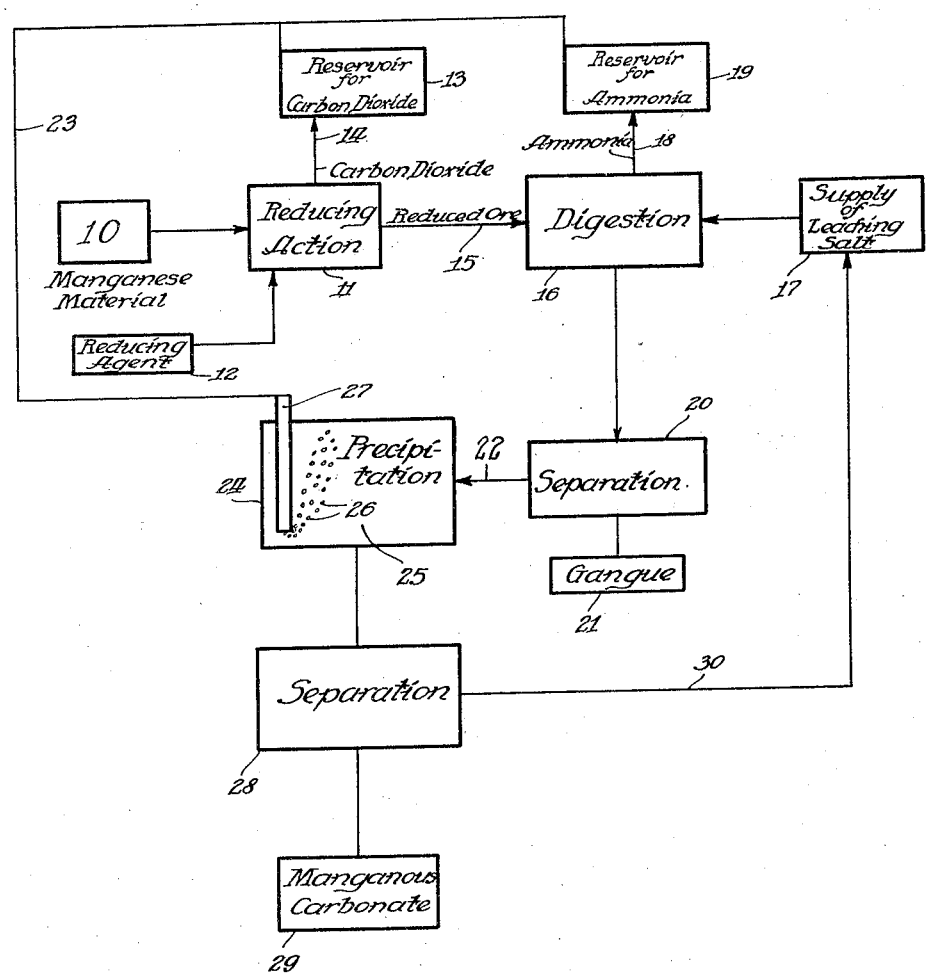

1,889,021

UNITED STATES PATENT OFFICE

KENNETH A. KOBE, OF MINNEAPOLIS, MINNESOTA, ASSIGNOR TO BRADLEY-FITCH COMPANY, OF DULUTH, MINNESOTA, A CORPORATION OF MINNESOTA

RECOVERY OF MANGANOUS COMPOUNDS

Application filed November 29, 1929. Serial No. 410,315.

The present invention relates to the concentration of manganese from materials containing manganese and other substances. It has particular reference to a cycle of operations and involves certain improvements in the cycles described in the application of Bradley Serial No. 154,369, filed December 13, 1926, and the British Laury Patent No. 284,098.

The cycle described by Laury may first involve the reduction of a mixture of material, such as low grade ore containing manganese dioxide or other forms of manganese, to form manganous oxide. Manganous oxide is leached from attendant substances by a salt solution, such as ammonium sulphate, by a reaction which proceeds when the effect of the resulting ammonia is minimized, as by the removal of ammonia. A solution of manganous sulphate results which is treated with ammonia to precipitate a manganese hydrate and to regenerate ammonium sulphate.

The process of Bradley involves the use of excessive quantities of the leaching agent so that the resulting manganous salt solution contains a large excess of the ammonium sulphate solution, when that is employed as the leaching salt. In the presence of ammonium sulphate, such as that regenerated in the Laury process during the precipitation by ammonia, manganous hydroxide is not completely precipitated as a considerable portion is likely to remain in solution. Nevertheless, manganic hydrates are not so held in solution by ammonium salts and are quite readily and more completely precipitated. Bradley employs air or oxygen to effect oxidation of manganous compounds to manganic compounds in order that a more efficient recovery may be maintained.

The reduction of the original material may be effected with carbon monoxide, with carbon, or with a mixture of carbon monoxide and carbon dioxide. Under such circumstances a considerable amount of carbon dioxide is discharged from the reduction process as a reaction product thereof.

The present invention aims to use the carbon dioxide in the precipitation step of the process, to precipitate efficiently without the necessity of using air, to use carbon dioxide in conjunction with ammonia as a precipitant, either as ammonium carbonate or as a mixture of carbon dioxide and ammonia, or to use carbon dioxide as a gas to be added to an ammoniacal solution in which precipitation is to be effected.

Another object of the invention is the utilization of waste gas of the digestion in combination with the waste gas of reduction to provide the precipitant for the liquor derived from the digestion process.

A particular object of the invention is the efficient precipitation of a manganous compound which is quite stable towards oxidation, which permits regeneration of the leaching liquor simultaneously with the precipitation, and which has a physical form when precipitated that enables a ready separation of the precipitate from the valuable regenerated leaching liquor.

Various other objects and advantages of the invention will become apparent from the following description of the invention as it may be practiced on low grade manganese ores. In the accompanying drawing there is shown a diagrammatic cycle of steps in the process, which are more particularly described hereinafter in order to illustrate the advantages of the invention and the method of carrying it into effect.

The process may be generally described without reference to the numerous details of the various steps entering into the process, these being adequately covered in the co-pending applications above referred to.

Ground ore 10 is treated in a reducing chamber represented generally by 11, into which a reducing gas is supplied from a source 12, which may be for blast furnace top gas, producer gas, or other gas containing carbon monoxide, with or without carbon dioxide, or other reducing agent capable of oxidation by higher oxides of manganese to form carbon dioxide. The temperature is such, for example 450° C., that the manganic content of the ore may be largely reduced to manganous oxide. A reservoir 13 is indicated for the storage of or as a supply of, gas containing carbon dioxide. Spent gas from the reduction may be passed by line 14 into the reservoir 13.

The reduced ore is conveyed by suitable means indicated 15 to a digestion apparatus 16 in which there is a leaching salt solution, such as one containing ammonium sulphate, derived from supply reservoir 17. Heat and agitation may be employed in the digestion, preferably near the boiling temperature, in order to drive off the ammonia which results from solution of manganous oxide in the ammonium sulphate, such removal being effected to minimize the retarding action of free ammonia on the further solution of the manganous oxide. The liberated ammonia gas is conveyed by means 18 to an ammonium storage system or reservoir 19. When digestion is complete a separation of the liquor and the residual matter is effected, as indicated at 20, the gangue 21 and the solution 22 being differently disposed of.

The liquor 22 contains manganous sulphate, and when the process of Bradley has been used it contains a large excess of ammonium sulphate. Both ammonia and carbon dioxide are employed in the step of precipitating a manganese product from the solution. Several methods of introducing the precipitant may be practiced. The ammonia and carbon dioxide gases may be bubbled through the solution in a vat or in a tower. Ammonia and carbon dioxide may be combined in a solution, or as crystals, as ammonium carbonate, and thus added to the solution. The digestion liquor may be made ammoniacal, and then the carbon dioxide may be added to form manganese carbonate. The essential feature of the precipitation is the introduction of ammonia for regeneration of the leaching salt, and the introduction of carbon dioxide to form an insoluble combination with the manganous ions.

In the drawing the process is illustrated as uniting gases from the ammonia storage 19 and from the carbon dioxide storage 13, in a line designated 23. A vat 24 represents precipitating apparatus containing digestion liquor 25 into which is bubbled the mixed gases 26 by means of submerged tubes or other means 27 providing outlets. The proportion of gas may be controlled to correspond to ammonium carbonate, but either the ammonia or the carbon dioxide may be in excess without any appreciable detriment to the precipitation. Economy dictates that ammonia should not be wasted, and suitable precautions in this respect should be observed. This is particularly true because the cycle is complete as to ammonia. More carbon dioxide is normally formed or introduced in the process as it is commercially practiced, than is required theoretically, so that there may be a waste of carbon dioxide without any substantial economic loss.

The manganous carbonate which is formed has been found to be more granular than the precipitated manganese hydrates of Laury or Bradley, and it is, therefore, more readily filtered and washed, to produce a cleaner and stronger regenerated leaching solution at less operating expense. This is an outstanding advantage in commercial operations.

A separation step is indicated at 28 and it is understood that washing of the precipitate forms part of this separation in the schematic description. The final product 29 is manganous carbonate, which may be treated to form another manganous compound or which may be dried, sintered, or metallized as desired. The separation provides a new supply of leaching liquor 30 which is substantially ammonium sulphate. This is lead to the supply 17 for digestion of reduced ore as already described.

I have used solutions which contain per liter 20 grams of manganous sulphate, and which vary in ammonium sulphate from 60 to 120 grams. Such solutions have been treated at various temperatures, such as 70° F. and 170° to 180° F. to effect the precipitation according to this invention, using as precipitants, either ammonium carbonate, or ammonia and carbon dioxide.

I have found that the higher temperatures favor the precipitation in giving a more rapid formation of the precipitate, better form, and more complete precipitation. I find that there is little difference between using ammonium carbonate solution as a precipitant and using carbon dioxide passed as a gas through an ammoniacal solution, although there is an indicated preference favoring the use of ammonium carbonate as the precipitant.

*Example I*—A solution containing per liter 20 grams of manganous sulphate ($MnSO_4$) and 120 grams of ammonium sulphate ($(NH_4)_2SO_4$) at 70° F. may be treated with about one-tenth its volume of a solution of ammonium carbonate which contains about 200 grams ammonium carbonate per liter, the amount and concentration of solution being at least sufficient, preferably without excess, theoretically to precipitate all the manganous content as manganous carbonate. The mixed solutions are allowed to stand for a sufficent length of time to insure completion of the precipitation, such as 30 minutes, and may then be filtered. I have found that precipitation by this method is twenty four times more efficient than when the same solution is treated under the same conditions with an amount of ammonia equivalent to the carbonate used, the carbon dioxide being wholly absent.

*Example II*—A solution containing per liter 20 grams of manganous sulphate and 60 grams of ammonium sulphate at 170° to 180° F. may be treated with about one-tenth its volume of a solution of ammonia containing about 42 grams of ammonia gas ($NH_3$) per liter, using sufficient theoretically to precipitate all the manganese in the solution. Because the solution is hereby made alkaline it is readily subject to oxidation, and air should be excluded where the manganous carbonate is desired. Carbon dioxide is then bubbled through the solution for about 30 minutes, after which the mass may be filtered and the precipitate washed and recovered.

I have found that by this procedure the efficiency is about 210% based upon precipitation effected merely by the use of the same amount of ammonia, the carbon dioxide addition being omitted.

In all the comparative work which has been done with the above concentrations, I have found that the solutions higher in ammonium sulphate give slightly less recovery than those with lower concentrations of ammonium sulphate. I have also found that precipitation with ammonium carbonate solution is more effective than precipitation by passing carbon dioxide into a solution with the same amount of ammonia therein as would be present after adding ammonium carbonate. Consequently, I prefer to add the ammonia and the carbon dioxide together, and to use an excess of each to insure completion of the precipitation.

One of the important advantages of the process, aside from operating advantages, is the fact that the process affords a means for precipitating quite completely a manganous compound which is ordinarily stable against subsequent oxidation on exposure. The precipitation by ammonia, as described by Laury is incomplete, and forms manganous hydrate which is readily oxidizable on exposure to air to form mixed oxide hydrates. In the use of air and ammonia as described by Bradley precipitation is far more complete, but the product is substantially manganic substance, which is incapable of conversion to a manganous compound without a subsequent reduction.

The present process provides directly a highly efficient preciptation of a stable manganous product which has a readily filterable form, which may be exposed to air without change of its state of oxidation, and which may be readily converted into other manganous compounds by suitable reaction, for example, a manganous salt by action with the corresponding acid.

What I claim is:

1. The process of obtaining manganous carbonate from material containing manganous oxide which comprises digesting the material with an ammonium salt solution, simultaneously removing the resulting ammonia as a gas, separating the resulting solution from residual matter, simultaneously precipitating from the solution manganous carbonate and regenerating the ammonium salt by the addition of carbon dioxide and ammonia, and recovering the precipitated manganous carbonate.

2. The process of obtaining manganous carbonate from material containing manganous oxide which comprises digesting the material with an ammonium sulphate solution, simultaneously removing the resulting ammonia as a gas, separating the resulting solution from residual matter, simultaneously precipitating from the solution manganous carbonate and regenerating the ammonium sulphate by the addition of carbon dioxide and ammonia, and recovering the precipitated manganous carbonate.

3. The process of obtaining manganous carbonate from material containing manganese oxides which comprises reducing the material with a reducing agent containing carbon, whereby to form carbon dioxide and manganous oxide, digesting the resulting reduced material with a solution of an ammonium salt, simultaneously removing the resulting ammonia as a gas, separating the resulting solution from residual matter, simultaneously precipitating manganous carbonate from the solution and regenerating the ammonium salt by the addition of ammonia and carbon dioxide to the solution, and separating the precipitated manganous carbonate and the regenerated solution.

4. The process of obtaining manganous carbonate from material containing manganese oxides which comprises reducing the material with a reducing gas containing carbon monoxide, whereby to form carbon dioxide and manganous oxide, digesting the resulting reduced material with an ammonium sulphate solution, simultaneously removing the resulting ammonia as a gas, separating the resulting solution from residual matter, simultaneously precipitating manganous carbonate from the solution and regenerating the ammonium sulphate by the addition of ammonia and carbon dioxide to the solution, and separating the precipitated manganous carbonate and the regenerated solution.

In witness whereof, I hereunto subscribe my name this 12 day of November, 1929.

KENNETH A. KOBE.